Figure 1:
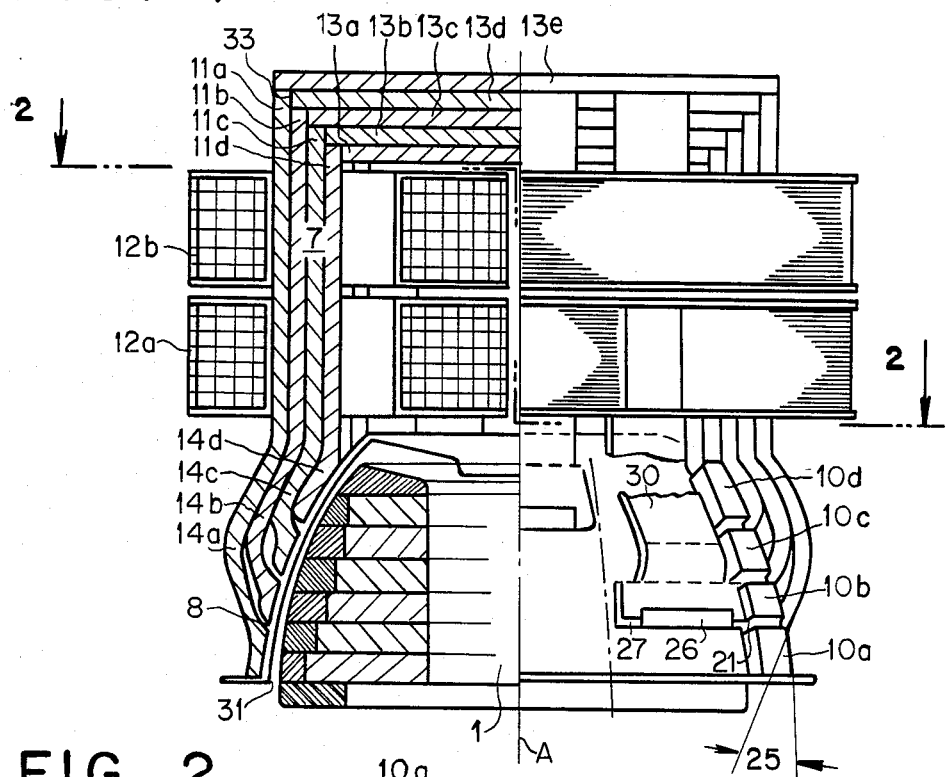

United States Patent [19]

Laing

[11] Patent Number: 4,620,120

[45] Date of Patent: Oct. 28, 1986

[54] STATOR HAVING TOOTH LAMINATION STRIPS LYING BETWEEN CIRCULAR CYLINDERS

[76] Inventor: Karsten Laing, 632 Marsat Ct., Chula Vista, Calif. 92011

[21] Appl. No.: 667,793

[22] Filed: Nov. 2, 1984

[51] Int. Cl.[4] .............................................. H02K 17/00
[52] U.S. Cl. ..................................... 310/166; 310/179; 310/216; 310/254
[58] Field of Search ................. 310/166, 104, 42, 216, 310/217, 218, 261, 86, 254, 258, 259, 184, 180; 417/420

[56] References Cited

U.S. PATENT DOCUMENTS

| | | | |
|---|---|---|---|
| 3,581,132 | 5/1971 | Laing | 310/166 |
| 3,814,963 | 6/1974 | Laing | 310/254 |
| 4,002,936 | 1/1977 | Laing | 310/166 |
| 4,043,706 | 8/1977 | Walker | 310/104 |
| 4,051,401 | 9/1977 | Hayward | 310/166 |
| 4,471,253 | 9/1984 | Laing | 310/166 |

Primary Examiner—R. Skudy
Attorney, Agent, or Firm—Pennie & Edmonds

[57] ABSTRACT

A stator design for a spherical gap motor having a stator and rotor wherein the lamination strips which make up the teeth of the stator are formed as portions of a cylindrical wall. Each of the lamination strips is concentric about the axis of rotation of the rotor. At the axial end of the lamination strips nearest the rotor pole-shoes are formed as a T-shaped end on the laminations. The ends of the lamination strips are provided with recesses in order to closely position adjacent strips. The recesses are adapted to receive lamination strips of adjacent pole-shoes in order to decrease the approach angle of the lamination to the pole-shoe. The ratio between the area of two adjacent pole-shoes which are exposed to the magnetic flux gap is the same ratio as the cross-sectional area of the respective lamination strips in a plane of rotation.

6 Claims, 2 Drawing Figures

STATOR HAVING TOOTH LAMINATION STRIPS LYING BETWEEN CIRCULAR CYLINDERS

The invention refers to stators of induction motors having conical or spherical airgaps.

In motors which have a spherical airgap the winding is arranged axially beside the rotor. The rotating field is generated by teeth distributed round the circumference, which are connected magnetically to the rotor via separate pole shoes and exhibit on the side remote from the rotor a yoke. The laminations forming the teeth are arranged radially; the pole shoes are formed by cups having circular segments.

Executions have also become known in which the teeth are formed from laminations forming a portion of a circular cylinder, these laminations continuing into pole shoes. In both cases there is between the pole shoe and the laminations of the tooth an airgap which increases the stray flux; furthermore the magnetic flux must penetrate the pole shoe, which leads to high eddy current losses.

The invention avoids these disadvantages. In accordance with the invention each tooth lamination is made T-shaped, the widened end region being deformed spherically and forming the pole shoe, designated below "the shoe", for the tooth lamination in question. The stray losses and eddy currents caused by separate pole shoes are thereby avoided. The geometry of the stators in accordance with the invention are to be described with the aid of Figures.

Figure 2:
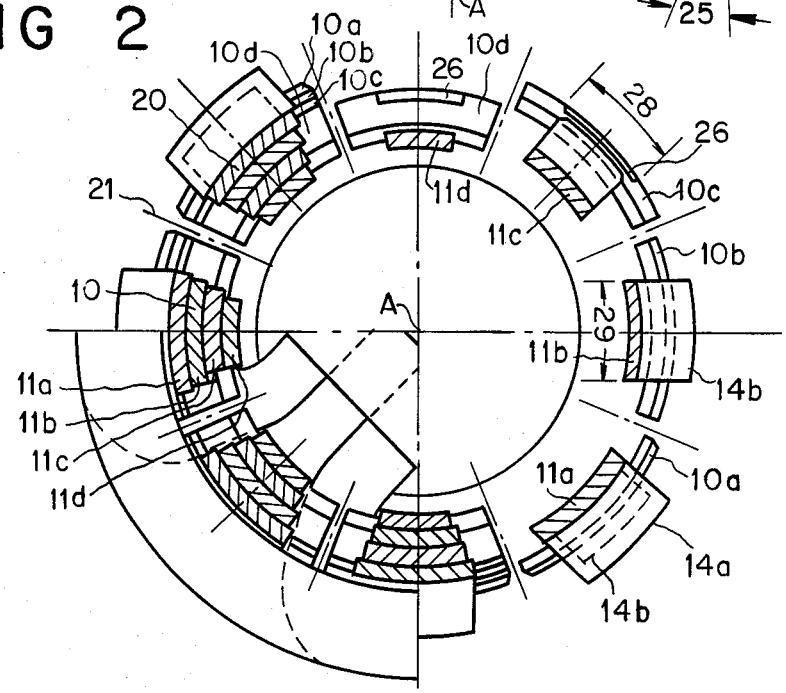

FIG. 1—shows in section and elevation a stator in accordance with the invention; and FIG. 2—shows sections through FIG. 1, lying in planes of rotation in two different planes.

FIG. 1 shows in the left-hand half a section through the rotor 1, a dividing wall 8 lying in the airgap 31 and a section lying in an axial plane through the tooth lamination strips 11a–11d. In FIG. 2 this sectioned tooth is designated by 10. The tooth lamination strips, as may be seen in FIG. 2, are made as segments of the wall of a cylinder running concentrically about the axis of rotation A. At the end of the tooth lamination strips remote from the rotor are circular discs or rings 13a–13d of soft iron which form together with a cover disc 13e a magnetic yoke between the teeth 7 forming a single unit having end regions 10, 20 (FIG.'S 1 and 2.) Each tooth butts by its axial end and a portion 33 of its cylindrical front region against two adjacent circular discs 13a to 13e. The teeth which exhibit axial length which increase toward outside. The tooth lamination strips 11a–11d are positioned cylindrically about the axis of rotation of the rotor and pass through the coils 12a and 12b. After that the tooth lamination strips diverge and run along curves in regions 14a–14d. The end regions 10a–10d lying transversely are bent down at a sharp edge and formed spherically so that they lie completely flat against the dividing wall 8. The widths in the circumferential direction of these end regions are so chosen that between the adjacent groups of end regions 10 and 20, called "shoes" below, narrow airgaps 21 remain. These airgaps 21 may either run along planes passing through the axis A or obliquely to them along spirals. Between the shoes 10a and the associated tooth lamination strip region 14a an angle 25 of about 40° is formed. In order that the shoes of end regions 10a to 10d lying one above the other in a curve-like manner and approximately touch one another, there is provided in the shoe of end region 10c following the shoe 10b a recess 26 the width 28 of which is so chosen that the one below ending the circumferential extent 29 of the tooth lamination strip 14a fits into the recess 26. In the right-hand half of FIG. 2 only one of the tooth lamination strips 11a to 11d which stacked one above the other form the tooth 7, is illustrated in each case. In the shoes of end regions 10b to 10d the recesses 26 may be seen. The shoes 10a–10d each have an area of surface next to the gap 31 for the magnetic flux. The area of the surface of each shoe is in a ratio to the area of surface of the remaining shoes equal to the ratio of the tooth lamination strips associated with the respective shoe, in a plane of section which lies in a plane of rotation.

I claim:

1. A stator for an electric motor having a rotating rotor with axis of rotation of which the gap running between the rotating rotor and the stator for the magnetic flux lies on a spherical surface, and in which the stator exhibits teeth which extend axially and are built, up from tooth lamination strips which pierce windings running in planes of rotation and are connected together in magnetic conductivity via a yoke at the axial end remote from the rotor, where pole shoes are provided through which the clearance between two teeth adjacent in the circumferential direction at the axial end next the rotor is reduced down to a narrow gap, characterized in that an area of the tooth lamination strips (11a to 11d) next the rotor (1) has shoes (10a to 10d) formed thereon which follow the spherical surface so that said shoes form groups of shoes (10 and 20) lying side by side and in the circumferential direction only a narrow gap (21) remains between adjacent groups of shoes, each of said shoes (10a to 10d) forming with one of said tooth lamination strip (11a to 11d) a single unit, where regions (14a to 14d) of the tooth lamination strips (11a to 11d) extending between windings (12a, 12b) and the shoes (10a to 10d) run along curves one above the other about the axis (A) of the rotor.

2. A stator as in claim 1, characterized in that the tooth lamination strips (11a to 11d) forming one tooth (10) exhibit axial lengths which increase towards the outside and enclose between them circular discs (13a to 13d).

3. A stator as in claim 1 or 2, characterized in that cross-sections of the tooth lamination strips (11a to 11d) lying in planes of rotation are made curved about the axis (A) of the motor so that they follow exactly the circumference of the circular discs (13a to 13d) associated with them.

4. A stator as in claim 1, characterized in that between the tooth lamination strips (11a to 11d) and the shoes (10a to 10d) belonging respectively to them an angle (25) of about 45° is formed.

5. A stator as in claim 4, characterized in that the shoes, e.g. (10b), exhibit a recess (26) at the edge (27) next to adjacent shoe (10a).

6. A stator as in claim 1, characterized in that areas of the shoes (10) at their surfaces next the gap (31) for the magnetic flux are in the ratio to one another of the cross-sections of the tooth lamination strips (11a–11d) associated with the shoes, in a plane of section which lies in a plane of rotation.

* * * * *